US012151203B2

(12) United States Patent
Lammers et al.

(10) Patent No.: US 12,151,203 B2
(45) Date of Patent: Nov. 26, 2024

(54) ADSORPTION DEVICE FOR COMPRESSED GAS

(71) Applicant: ATLAS COPCO AIRPOWER, NAAMLOZE VENNOOTSCHAP, Wilrijk (BE)

(72) Inventors: Carlo Lambert J. Lammers, Wilrijk (BE); Hans Hermans, Wilrijk (BE); Geert Van Rompaey, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 0 days.

(21) Appl. No.: 18/135,207

(22) Filed: Apr. 17, 2023

(65) Prior Publication Data

US 2023/0249124 A1    Aug. 10, 2023

Related U.S. Application Data

(63) Continuation of application No. 17/032,003, filed on Sep. 25, 2020, now Pat. No. 11,628,398, which is a
(Continued)

(30) Foreign Application Priority Data

Nov. 6, 2015   (BE) .................... 2015/5727

(51) Int. Cl.
*B01D 53/02*   (2006.01)
*B01D 53/04*   (2006.01)
(Continued)

(52) U.S. Cl.
CPC ........... *B01D 53/261* (2013.01); *B01D 53/02* (2013.01); *B01D 53/04* (2013.01);
(Continued)

(58) Field of Classification Search
CPC ...... B01D 53/261; B01D 53/02; B01D 53/04; B01D 53/0415; B01D 53/06;
(Continued)

(56) References Cited

U.S. PATENT DOCUMENTS 2,930,445 A   3/1960   Glass et al.
3,713,281 A   1/1973   Asker et al.
(Continued)

FOREIGN PATENT DOCUMENTS

CN   103429339   12/2013
EP   0157651 A2   10/1985
(Continued)

OTHER PUBLICATIONS

OA issued May 6, 24 in corresponding JP Appln. 2023/089439, with translation.
(Continued)

*Primary Examiner* — Frank M Lawrence, Jr.
(74) *Attorney, Agent, or Firm* — BACON&THOMAS,PLLC

(57) ABSTRACT

An adsorption device for compressed gas or a non-compressed gas, is provided with a vessel with an inlet for the supply of a compressed gas or a non-compressed gas to be treated, and an outlet for treated gas and an adsorption element is affixed in the vessel. The adsorption element extends along the flow direction of the compressed gas or the non-compressed gas to be treated, between the inlet and the outlet. The adsorption element has a monolithic supporting structure that is at least partially provided with a coating that contains an adsorbent.

14 Claims, 5 Drawing Sheets

Related U.S. Application Data continuation of application No. 15/755,101, filed as application No. PCT/BE2016/000026 on Jun. 14, 2016, now Pat. No. 10,786,779.

(60) Provisional application No. 62/212,128, filed on Aug. 31, 2015.

(51) Int. Cl.
| | |
|---|---|
| *B01D 53/06* | (2006.01) |
| *B01D 53/26* | (2006.01) |
| *B01J 20/28* | (2006.01) |
| *B01J 20/32* | (2006.01) |
| *F16J 15/00* | (2006.01) |

(52) U.S. Cl.
CPC ......... *B01D 53/0415* (2013.01); *B01D 53/06* (2013.01); *B01J 20/28042* (2013.01); *B01J 20/28052* (2013.01); *B01J 20/32* (2013.01); *B01J 20/3204* (2013.01); *B01J 20/3236* (2013.01); *B01J 20/3238* (2013.01); *B01J 20/324* (2013.01); *B01J 20/3291* (2013.01); *F16J 15/00* (2013.01); *B01D 2253/102* (2013.01); *B01D 2253/104* (2013.01); *B01D 2253/106* (2013.01); *B01D 2253/108* (2013.01); *B01D 2253/204* (2013.01); *B01D 2253/25* (2013.01); *B01D 2253/342* (2013.01); *B01D 2256/10* (2013.01); *B01D 2257/104* (2013.01); *B01D 2257/504* (2013.01); *B01D 2257/80* (2013.01); *Y02C 20/40* (2020.08)

(58) Field of Classification Search
CPC ........ B01D 2253/102; B01D 2253/104; B01D 2253/106; B01D 2253/108; B01D 2253/204; B01D 2253/25; B01D 2253/342; B01D 2256/10; B01D 2257/104; B01D 2257/504; B01D 2257/80; B01D 53/0423; B01D 53/28; B01J 20/28042; B01J 20/28052; B01J 20/32; B01J 20/3204; B01J 20/3236; B01J 20/3238; B01J 20/324; B01J 20/3291; B01J 20/3225; B01J 20/3234; F16J 15/00; F16J 15/0887; F16J 15/104; F16J 15/3236; Y02C 20/40
USPC ............ 95/113; 96/125, 131, 138, 132, 154; 55/502; 210/282
See application file for complete search history.

(56) References Cited

U.S. PATENT DOCUMENTS

| | | | | |
|---|---|---|---|---|
| 4,203,949 A | * | 5/1980 | Mase | B01J 35/56 29/890 |
| 4,362,700 A | * | 12/1982 | Hayashi | F01N 3/2853 60/299 |
| 4,386,947 A | | 6/1983 | Mizuno et al. | |
| 4,444,721 A | * | 4/1984 | Ohkata | F01N 3/2867 60/299 |
| 5,288,306 A | | 2/1994 | Aibe et al. | |
| 5,512,083 A | | 4/1996 | Dunne | |
| 5,656,245 A | * | 8/1997 | Fujisawa | F01N 3/2853 60/299 |
| 6,097,011 A | | 8/2000 | Gadkaree et al. | |
| 6,139,609 A | | 10/2000 | Eimer et al. | |
| 6,558,457 B1 | | 5/2003 | Kolczyk | |
| 6,814,771 B2 | | 11/2004 | Scardino et al. | |
| 7,300,905 B2 | | 11/2007 | Keefer et al. | |
| 7,378,060 B2 | * | 5/2008 | Sinha | F01N 3/2853 422/179 |
| 7,722,705 B2 | | 5/2010 | Gadkaree et al. | |
| 7,767,442 B2 | | 8/2010 | Kudo et al. | |
| 7,909,919 B2 | | 3/2011 | Kosugi et al. | |
| 8,882,874 B1 | | 11/2014 | Cross | |
| 9,339,754 B2 | | 5/2016 | Davidian | |
| 2001/0009124 A1 | | 7/2001 | Suzuki et al. | |
| 2004/0134171 A1 | | 7/2004 | Scott et al. | |
| 2004/0231179 A1 | | 11/2004 | Kodama et al. | |
| 2006/0208004 A1 | | 9/2006 | Feather | |
| 2007/0261557 A1 | | 11/2007 | Gadkaree et al. | |
| 2008/0282888 A1 | | 11/2008 | Deckman et al. | |
| 2009/0041635 A1 | * | 2/2009 | Berkey | B28B 11/12 422/177 |
| 2011/0247312 A1 | | 10/2011 | Bookbinder | |
| 2011/0308214 A1 | * | 12/2011 | Jessberger | B01D 46/2411 55/502 |
| 2012/0090470 A1 | | 4/2012 | McKenna et al. | |
| 2014/0305309 A1 | | 10/2014 | McKenna et al. | |
| 2015/0040765 A1 | | 2/2015 | Zastera et al. | |
| 2016/0096163 A1 | | 4/2016 | House et al. | |
| 2016/0236135 A1 | | 8/2016 | Tammera et al. | |

FOREIGN PATENT DOCUMENTS

| | | |
|---|---|---|
| EP | 0428990 A1 | 5/1991 |
| EP | 2130578 A1 | 12/2009 |
| EP | 2829318 A1 | 1/2015 |
| JP | 2000509354 A | 7/2000 |
| JP | 2005501688 A | 1/2005 |
| RU | 66691 U1 | 9/2007 |
| RU | 2393002 | 6/2010 |
| SU | 1279657 A1 | 12/1986 |
| WO | 98/18541 | 7/1998 |
| WO | 02066152 | 8/2002 |
| WO | 2012118755 | 7/2012 |

OTHER PUBLICATIONS

International Search Report dated Oct. 31, 2016 on PCT/BE2016/000026.
International Search Report on PCT/BE2016/000032 dated Jan. 4, 2017.
Indian Office Action in corresponding Indian Application No. 201837004124, dated Aug. 8, 2019.
T. G. Andronikashvili et al., Russian Journal of Applied Chemistry, vol. 77, No. 12, 2004, pp. 1939-1944.
EP Search Report in corresponding EP Application No. 20199982, dated Jan. 15, 2021.

* cited by examiner

ADSORPTION DEVICE FOR COMPRESSED GAS

The present invention relates to an adsorption device for compressed gas or a non-compressed gas, for example compressed air or non-compressed air.

BACKGROUND OF THE INVENTION

More specifically, the invention concerns an adsorption device for compressed gas or a non-compressed gas, whereby this adsorption device comprises a vessel in which an adsorbent, for example a drying agent, or a 'desiccant', is placed. The vessel concerned is provided with an inlet for supplying a compressed gas or a non-compressed gas to be treated, and an outlet for discharging treated gas.

The adsorbent concerned is generally realised in the form of a regeneratable adsorbent, or in other words an adsorbent that can be regenerated after reaching a certain degree of saturation. For simplicity, the following primarily refers to an adsorbent in the form of a drying agent, but the invention also extends to other adsorbents. For example, with a drying device it is indeed the case that as the adsorbent, that is constructed in the form of a drying agent, extracts moisture from the gas to be dried, this drying agent will become increasingly saturated with adsorbed moisture. Hence, it is usual, after using the drying agent for a certain time to dry compressed gas or a non-compressed gas, to regenerate this drying agent, for example by exposing it to a regeneration gas flow that extracts the moisture from the drying agent. Such a regeneration gas flow can consist of a fraction of the dried gas and/or hot gas for example whose relative humidity is sufficiently low to be able to realise the regeneration of the drying agent.

In some embodiments of drying devices for compressed gas or a non-compressed gas, use is made of two or more vessels of drying agent. With two vessels this principle of drying device is also referred to as a twin tower dryer. In such a type of drying device a compressed gas or a non-compressed gas, for example originating from a compressor, can be passed through the first of the aforementioned vessels for example, where it will be dried by the drying agent in the vessel concerned, after having passed through an after cooler and a condensate separator (which may or may not form part of the after cooler concerned). This vessel consequently acts as a drying vessel.

At the same time, a regeneration gas flow can be guided through a second aforementioned vessel in order to regenerate the drying agent in that second vessel by extracting the moisture from this drying agent. This can be done by making use of a gas that has already been dried, for example, that is tapped off downstream from the drying vessel for example and/or by supplying a gas flow that has been heated, for example by recovering the heat generated in the compressor during the compression. In this last case it is called a "heat of compression" or HOC dryer. Other known regeneration principles can of course also be used.

When the drying agent in the drying vessel has reached a certain degree of saturation, the gas flows through the first and the second vessel can be changed over, such that the drying agent in the first vessel will now be regenerated by a regeneration gas flow while the second vessel will take on the role of drying vessel. In this way the two or more vessels will alternately operate as a drying pressure vessel and a regenerating pressure vessel, such that continuity in the drying process can be realised. Examples of such drying devices with a number of vessels are described for example in US 2003/023.941, U.S. Pat. Nos. 4,783,432, 6,375,722, EP 1.776.171 and WO 2006/050.582.

The drying agent that is used in such adsorption devices with a number of vessels often consists of grains of silica gel, activated alumina or a molecular sieve material, or a combination thereof. As is known activated alumina is produced by thermal dehydration or activation of aluminium hydroxide $Al(OH)_3$, while molecular sieves consist of synthetic zeolites (crystalline aluminosilicates).

A limitation of such a type of drying device that comprises a drying agent in a granular form, consists of the gas speeds through the vessels having to be limited in order to counteract grains moving against one another or even fluidisation. Indeed, due to the grains being set in motion friction will occur between them, which in turn leads to dust formation and a reduced drying capacity. Other causes of such dust formation are for example pressure variations and/or thermal shocks. Moreover, the pressure drop across a twin tower dryer is relatively high and the desiccant grains have a rather high thermal mass.

Alternative drying devices are known for compressed gas or a non-compressed gas, whereby the drying agent is placed in a rotating drum, while a drying zone and regeneration zone extend in the vessel. During the operation of such a drying device, the drying drum will be made to rotate by drive means provided to this end, such that the drying agent in this drying drum will alternately be taken through the drying zone and the regeneration zone. The compressed gas or non-compressed gas to be dried will be guided through the drying zone, while the regeneration gas flow is guided through the regeneration zone, in order to realise simultaneous drying of compressed gas non-compressed gas in the drying zone and regeneration of the drying agent in the regeneration zone.

Examples of such drying devices that are provided with a rotating drying drum are described for example in WO 00/033.943, WO 00/074.819, WO 01/078.872, WO 01/087.463, WO 02/038.251, WO 2007/079533, WO 2005/070.518, WO 2006/012.711, GB 1.226.348, GB 1.349.732, GB 1.426.292, U.S. Pat. Nos. 3,490,201, 5,385,603 and 8,349,054.

The drying agent or desiccant that is used in the known drying devices for drying compressed gas or non-compressed gas consists of silica gel, molecular sieves, activated alumina or a combination thereof, for example. As is known, the drying agent can be affixed on a support such as a corrugated structure of glass fibres or ceramic fibres that are rolled up for example to form a honeycomb structure in the vessel, for example as described in U.S. Pat. No. 5,683,532.

In practice it turns out that with the known drying devices for drying compressed gas or non-compressed gas, under certain conditions such as in the event of insufficient regeneration of the drying agent and oversaturation thereof, the drying agent goes through a complex breakdown process that in some cases can ultimately result in the failure of the drying device, for example in the case of silica gel as a drying agent in a rotor, because the binder function of the silica gel decreases, which leads to a loss of structural strength of the supporting glass fibre matrix, and also because the adsorbing function of the silica gel decreases as a result of hydrolisation and breakdown of the silica gel structure.

Thus the adsorption behaviour and adsorption capacity of a silica gel rotor, in severe conditions of high moisture and high temperature will substantially change during the useful life of the rotor.

SUMMARY OF THE INVENTION

The purpose of the present invention is to provide an adsorption device for compressed gas or non-compressed gas that provides a solution for one or more of the disadvantages attached to the conventional, already known, adsorption devices that make use of an adsorbent.

To this end the invention concerns an adsorption device for compressed gas or non-compressed gas, whereby this adsorption device is provided with a vessel with an inlet for the supply of a compressed gas or a non-compressed gas to be treated, and an outlet for treated gas and whereby an adsorption element is affixed in the aforementioned vessel, whereby this adsorption element extends along the flow direction of the compressed gas or the non-compressed gas to be treated between the aforementioned inlet and the aforementioned outlet, and, according to the invention, consists of a monolithic supporting structure that is at least partially provided with a coating that comprises an adsorbent.

An advantage of such an adsorption device according to the invention is that there is no risk of movement or fluidisation, as no loose grains of adsorbent are used. As a result dust formation is prevented, while a relatively high flow rate of the compressed gas or the non-compressed gas to be treated through the adsorption device is possible.

Moreover, such an adsorption device according to the invention enables the vessel to be placed vertically, sloping or even horizontally, which is not possible with conventional drying devices that make use of a granular drying agent for example, as the horizontal use of such known drying devices can lead to a rearrangement of the grains and the formation of internal leakage paths and consequently a reduced dryer performance.

According to a preferred characteristic of the invention, the aforementioned monolithic supporting structure comprises one or more of the following materials: ceramic material, metal foil, a fibre structure and a polymer. Particularly good results are obtained with the use of a ceramic structure that contains cordierite.

Preferably the aforementioned adsorbent contains one or more of the following materials: a zeolite, silica gel, activated alumina, activated carbon, metal organic frameworks, carbon molecular sieve (CMS), an impregnated adsorbent and a hybrid adsorbent. In particular a hydrophilic zeolite support is preferable. Good results are obtained by making use of faujasite or zeolite type X, in which the silicon/aluminium ratio is between 2 and 3.

According to a particular embodiment of the invention, the adsorption device comprises a number of adsorption elements placed in series in the aforementioned vessel along the flow direction of the gas.

The present invention also relates to an adsorption element for an adsorption device for compressed gas or non-compressed gas, whereby this adsorption element comprises a monolithic supporting structure that is at least partially provided with a coating that contains an adsorbent.

In addition the invention also concerns a cartridge that comprises a stack of adsorption elements that are provided with a monolithic supporting structure that is at least partially provided with a coating that contains an adsorbent.

In addition the invention also concerns a cartridge that comprises a single adsorption element that is provided with a monolithic supporting structure which is at least partially provided with a coating that contains an adsorbent. This cartridge is interchangeable or replaceable.

BRIEF DESCRIPTION OF THE DRAWINGS

With the intention of better showing the characteristics of the present invention, a few preferred embodiments of an adsorption device according to the invention are described hereinafter by way of an example, without any limiting nature, with reference to the accompanying drawings, wherein.

DETAILED DESCRIPTION OF THE INVENTION

Figure 1:
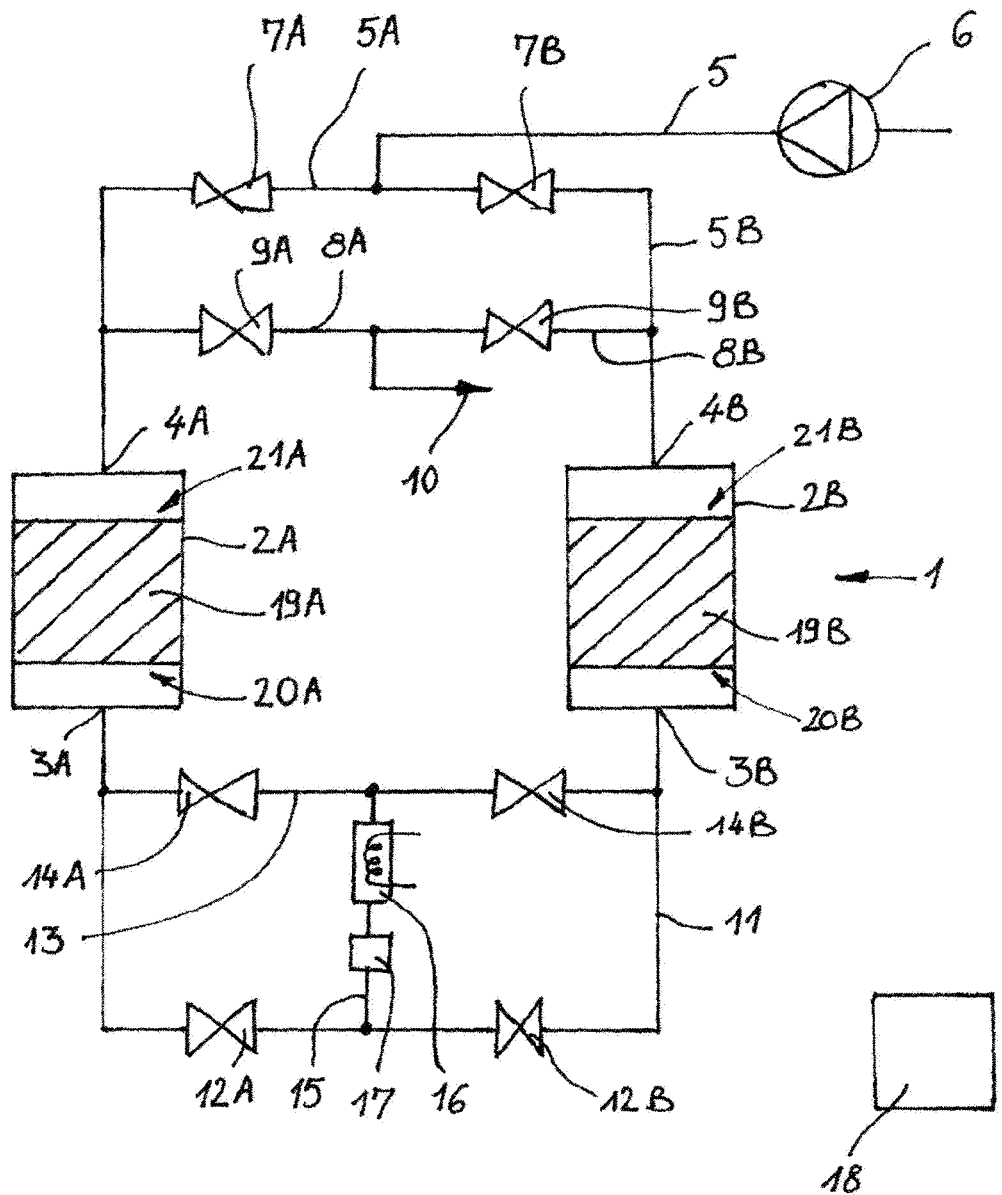
FIG. 1 schematically shows an adsorption device according to the invention.

FIG. 1 schematically shows a possible embodiment of an adsorption device 1 according to the invention, which in this case forms a drying device and which comprises two vessels 2A and 2B that are each provided with an inlet 3A and 3B respectively for the supply of a compressed gas to be treated (in this case dried) and an outlet 4A and 4B respectively for the discharge of treated (in this case dried) compressed gas.

The respective outlets 4A and 4B are connected to a pressure pipe 5 of a compressor 6 via outlet pipes 5A and 5B, in this example an air compressor. Each of the outlet pipes 5A and 5B can be shut off by means of an outlet valve 7A and 7B respectively provided to this end.

Between the outlet valve 7A and 7B respectively on the one hand and the outlet 4A and 4B respectively, a connection is provided on each outlet pipe 5A and 5B to a discharge pipe 8A and 8B respectively that can be closed off by means of a discharge valve 9A and 9B respectively, and which in this case, but not necessarily, is connected to a common outlet 10.

The aforementioned inlets 3A and 3B are connected together by means of a connecting pipe 11 in which a first set of two shutoff valves 12A and 12B are placed in series. The valves 12A and 12B concerned are bypassed by a bypass pipe 13 in which a second set of two shutoff valves 14A and 14B are placed in series.

The connecting pipe 11 and the bypass pipe 13 are connected together by means of a cooling pipe 15, in which a heat exchanger 16 and a condensate separator 17 are affixed. One end of the cooling pipe 15 connects to the connecting pipe 11 between the first set of shutoff valves 12A and 12B, while the other end of the cooling pipe 15 is connected to the bypass pipe 13, between the second set of shutoff valves 14A and 14B.

In this example each of the outlet valves 7A and 7B, the discharge valves 9A and 9B and the shutoff valves 12A, 12B, 14A, 14B are constructed in the form of a controllable shutoff valve that is connected to a control unit 18, either via control cables provided to this end, which for clarity are not included in the drawing, or wirelessly.

According to the invention, an adsorption element 19A and 19B respectively is affixed in each of the aforementioned vessels 2A and 2B, in this case in the form of drying elements, more specifically in the flow path of the gas to be dried, or in other words according to the flow direction of the compressed gas to be treated between the aforementioned inlet 3A and 3B respectively on the one hand, and the aforementioned outlet 4A and 4B respectively on the other hand.

With regard to the first vessel 2A, an inlet side 20A of the adsorption element 19A will extend opposite the aforementioned inlet 3A, while an outlet side 21A of the adsorption element 19A extends opposite the outlet 4A.

Analogously the adsorption element 19B in the second vessel 2B has an inlet side 20B and an outlet side 21B that extend opposite the inlet 3B and the outlet 4B respectively.

According to the invention the adsorption elements 19A and 19B comprise a monolithic supporting structure that preferably, but not necessarily, consists of a ceramic structure that contains cordierite, for example Celcor© by Corning. Alternatively, according to the invention, other materials can also be used for the manufacture of the supporting structure concerned, such as:

- other ceramic materials such as mullite, γ - or α -alumina or silicon carbide (SiC);
- metal foil; or
- a fibre structure, for example based on glass fibre, ceramic fibre or other fibres, or a mixture of different types of fibres; or
- a polymer.

It goes without saying that the aforementioned list is not exhaustive and the use of other materials is not excluded.

According to the invention, it is not excluded either that the monolithic supporting structure is made of a combination of two or more of the aforementioned and/or other materials.

The material of the supporting structure preferably contains between 200 and 1200 CPSI (cells per square inch), and more preferably between 350 and 450 CPSI.

The wall thickness of the supporting structure is preferably between 2 and 11 mil (milli-inch), and more preferably between 3 and 9 mil, and even more preferably between 5 and 7.5 mil. In a most preferred embodiment, the wall thickness is between 6 and 7 mil, preferably approximately 6.5 mil.

The porosity of the wall of the supporting structure is preferably greater than 5%, and more preferably greater than 10%, and even better greater than 20%.

The cells formed preferably have a square shape, but can present other shapes such as triangular, sinusoidal, circular, hexagonal and similar.

According to the invention the aforementioned monolithic supporting structure is at least partially provided with a coating that contains an adsorbent.

According to the invention, the adsorbent concerned can contain one or more of the following and/or other materials:

- a zeolite, preferably a hydrophilic zeolite, but a hydrophobic zeolite is also possible—this zeolite can be faujasite zeolite type X for example, for example Zeolum F9 of Tosoh, or a mixture of zeolite type X and A;
- silica gel;
- activated alumina;
- activated carbon;
- metal-organic frameworks;
- carbon molecular sieve (CMS);
- an impregnated adsorbent; and
- a hybrid adsorbent.

The above list is not exhaustive and other materials are also possible according to the invention.

The choice of the adsorbent depends on what treatment the gas to be treated must go through, such as drying or the removal of other molecules such as oxygen or carbon dioxide, for example when using the adsorption device as a nitrogen generator, whereby the compressed gas to be treated is compressed air.

The distribution of the particle size of the adsorbent is preferably such that $D_{50}$ is less than 10 μm and more preferably less than 4 μm.

In addition to the aforementioned adsorbent, the aforementioned coating preferably also contains a binder material, preferably an inorganic binder material such as:

- colloidal silica, for example Ludox-AS 40 of Grace Davison;
- alumina; and/or
- clay.

Moreover, if need be use can be made of an organic binder material such as:

- methyl cellulose;
- polymers such as acrylic resins, vinyl resins and similar; and/or
- a material from the cellulose group.

Figure 2:
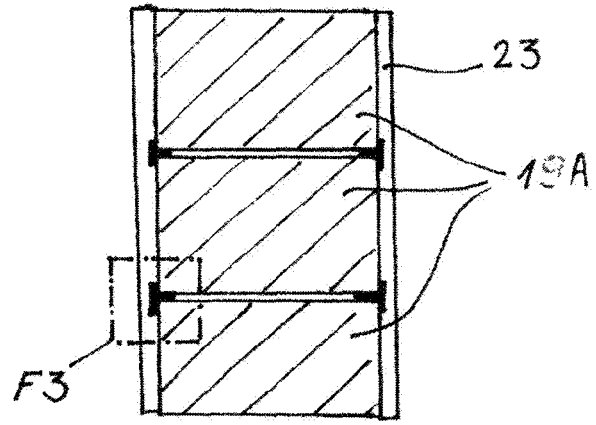
FIG. 2 shows a cartridge of adsorption elements according to the invention.

In the example of FIG. 1 each vessel 2A and 2B contains one single adsorption element 19A and 19B respectively, but the invention is not limited as such, as, according to a variant of an adsorption device 1 according to the invention, as shown in FIG. 2, two or more adsorption elements 19A or 19B can also be placed in series in a vessel 2A and/or 2B along the flow direction of the gas.

In another embodiment, the compressor 6 is replaced by a blower or low-pressure device.

FIG. 2 shows an example of a number of adsorption elements 19A stacked on one another, which in this example are disc shaped and all present a flat top and bottom surface.

In each case, a seal 22 is preferably provided between two adsorption elements 19A stacked on one another, over the peripheral edge of these adsorption elements 19A, in this case a ring-shaped seal that extends between the interfaces of the stacked adsorption elements 19A with at least one radial lip oriented inwards, and in this case with two V-shaped radial lips 23 oriented inwards.

Preferably, shrink sleeving 24 is affixed over the peripheral wall of the entire stack of adsorption elements, that is preferably made of an elastic material that is not very permeable to gas, for example polyolefin. The shrink sleeving 24 concerned can also be affixed over just a part of the height of the stack of adsorption elements.

The set of stacked adsorption elements 19A thus forms a cartridge that is interchangeable or replaceable according to a particular aspect of the invention.

The operation of an adsorption device 1 according to the invention is very simple and as follows.

In the first instance, in this example the first vessel 2A will fulfil the role of a drying vessel, while the adsorption element 19B (that is thus a drying element here) will be regenerated in the second vessel 2B.

The compressor 6 draws in a gas, for example surrounding air, and compresses this gas. The compressed hot gas is then carried through the outlet pipe 5B via the pressure pipe 5 via the open outlet valve 7B to the outlet 4B of the second vessel 2B.

The hot compressed gas will have a sufficiently low relative humidity to extract moisture from the adsorption element 19B present in the drying agent and will thus regenerate this adsorption element 19B. In other words the desiccant is dried in the second vessel 2B.

The hot moist gas is then driven via the open shutoff valve 14B to the cooling pipe 15, where it is guided successively through the heat exchanger 16 and the condensate separator 17 to then be carried via the open shutoff valve 12A and the connecting pipe 11 to the inlet 3A of the first vessel 2A.

The cold compressed gas that is 100% saturated will enter the first vessel 2A via the inlet 3A and be guided through the adsorption element 19A.

The adsorbent present on the supporting structure will extract moisture from the gas during the flow of the compressed gas through the adsorption element 19A. In this example the adsorbent will consequently fulfil the role of a drying agent or desiccant material.

The gas that leaves the adsorption element 19A, at the outlet side 21A thereof, will be drier than the gas that entered the vessel 2A via the inlet 3A.

The dried compressed gas then flows, via the outlet 4A, through the outlet pipe 5A and the open discharge valve 9A to the discharge pipe 8A and to the outlet 10 connected thereto, which can be connected to a consumer of dried compressed gas.

After a certain cycle time, the operation of both vessels 2A and 2B can be changed over and the second vessel 2B can take on the role of a drying vessel, while the desiccant in the first vessel 2A can be regenerated.

On account of the fact that the adsorption device 1 according to the invention does not make use of a granular desiccant, the vessels 2A and 2B can be placed in any position such as vertical, horizontal or any other position.

As the adsorbent is attached to a supporting structure there is no risk of fluidisation, such as with a granular desiccant, and consequently dust formation cannot occur, not even at high gas speeds through the adsorption element.

When use is made of a number of adsorption elements 19A placed on one another, as shown in FIG. 2, the gas will flow sequentially through the successive adsorption elements, either as gas to be dried or as a regeneration gas.

The presence of the aforementioned seals 22 between successive adsorption elements 19A prevents leakages being able to occur between the side wall of the stack of adsorption elements 19A on the one hand, and the inside wall of the vessel 2A on the other hand. For the rest, the same applies to the use of such a stack of a number of adsorption elements 19B in the second vessel 2B, which of course is also possible and can be provided with the said seals 22.

Figure 4:
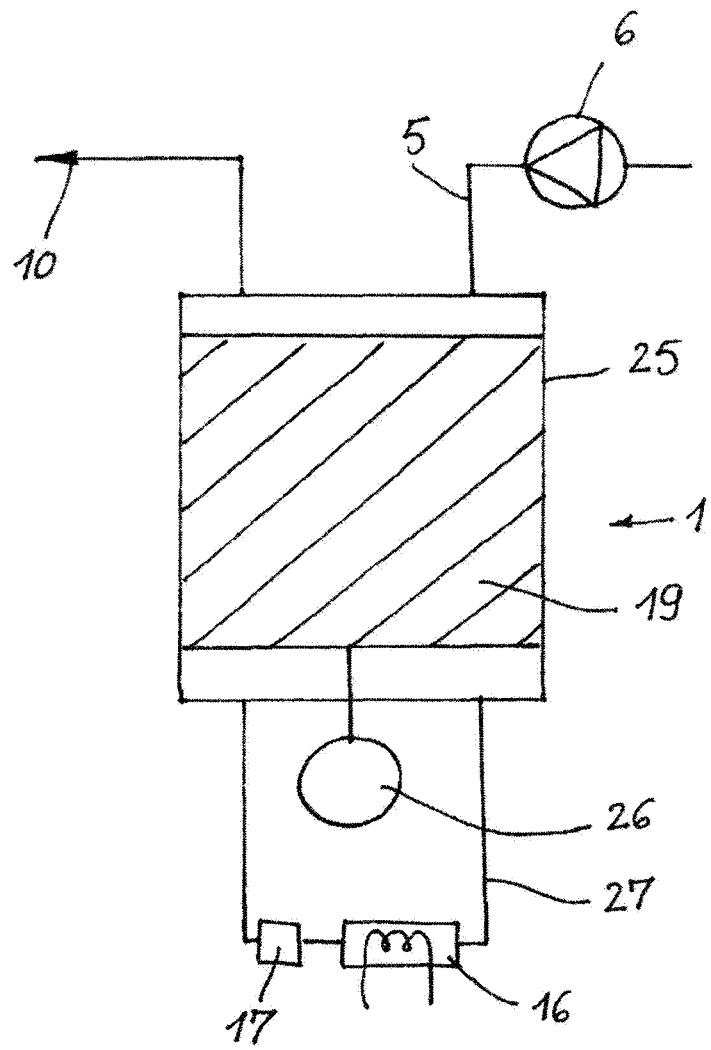
FIG. 4 shows a variant of an adsorption device according to FIG. 1.

FIG. 4 shows another embodiment of an adsorption device 1 according to the invention, whereby in this case there is only one vessel 25 in which an adsorption element 19 is rotatably affixed. The adsorption element 19 is attached to drive means, for example in the form of an electric motor 26.

As with known rotary drum dryers a regeneration zone and an adsorption zone (in this case a drying zone) extend in the vessel. The pressure pipe 5, in this case originating from a compressor 6, connects to the inlet of the regeneration zone, as is the case with known HOC dryers. The outlet of the regeneration zone is connected to the inlet of the adsorption zone in a known way via a connecting pipe 27. A heat exchanger 16 and condensate separator 17 are provided in the connecting pipe 27 concerned.

Finally, the outlet of the regeneration zone is connected to the outlet 10 via a discharge pipe.

In another embodiment, the compressor 6 is replaced by a blower or low-pressure device.

The operation of an adsorption device according to FIG. 4 is analogous to that of known HOC dryers with a rotary drum in which a drying agent is provided. However, on account of the structure of the adsorption element 19, such an improved adsorption device according to the invention is not susceptible to failure on account of a reduction of strength. After all, the monolithic supporting structure of an adsorption element in an adsorption device of the invention does not lose structural strength, not even under severe conditions of high humidity and high temperature.

The embodiments of an adsorption device 1 according to the invention shown in the drawings are both full-flow HOC dryers, however the invention is not limited as such, as an adsorption device 1 according to the invention does not necessarily have to operate according to a full-flow principle. Likewise, according to the invention it is not required either that the heat of compression is employed for the regeneration of the adsorbent, but use can be made of any regeneration gas that originates from the process itself or otherwise, and which is compressed gas or otherwise.

Figure 3:
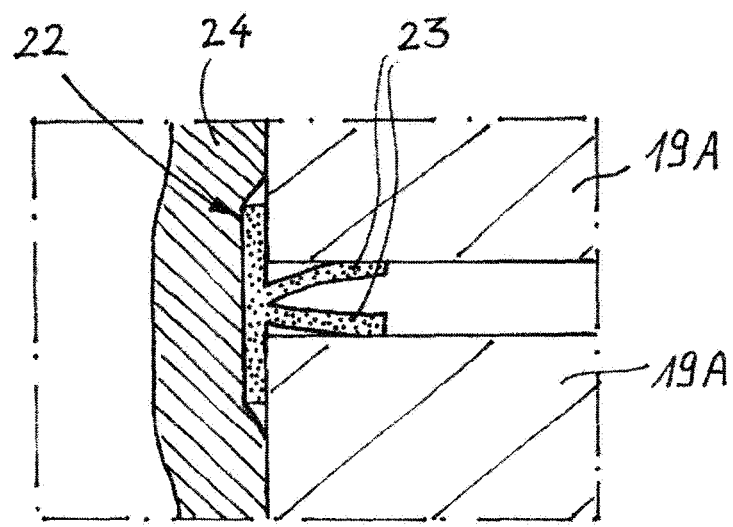
FIG. 3 shows the part indicated by F3 in FIG. 2 on a larger scale.
Figure 5:
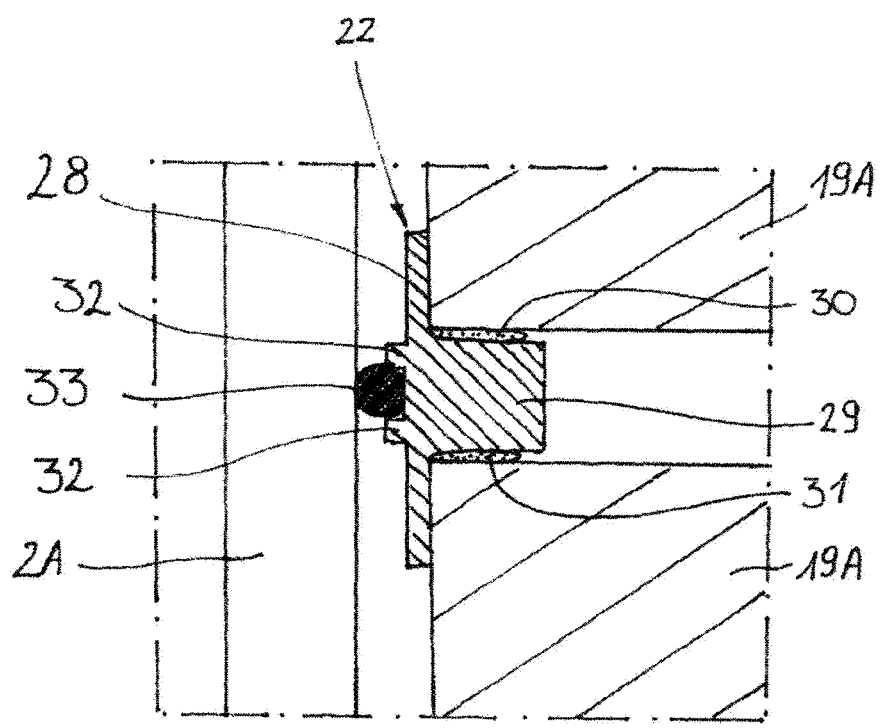
FIG. 5 shows a variant of the invention in the mounted state of the stack of adsorption elements in a vessel.

FIG. 5 shows a variant of the detail shown in FIG. 3, whereby in this case the stack of adsorption elements 19A is affixed in the vessel 2A and a part of the wall of this vessel 2A can be seen.

In this example the seal 22 comprises a ring 28, for example but not necessarily of aluminium, another metal or a polymer, whereby the inside diameter of this ring 28 is somewhat larger than the outside diameter of the adsorption elements 19A, which in this example are disc shaped.

The ring 28 extends over the peripheral edge of the ends of the adsorption elements 19A placed on one another. On its inside periphery the ring 28 concerned is provided with a radial edge 29 oriented inwards, against which the ends concerned of the adsorption elements are affixed.

In order to obtain a good seal and prevent leakage paths, a sealing layer 30 and 31 respectively is affixed over the entire periphery on either side of the edge 29 concerned, for example in the form of a quantity of adhesive or another sealing element.

In this example, the ring 28 is provided over its outer periphery with two practically parallel ribs 32 at an axial distance from one another, between which a seal 33 is affixed, in this case in the form of an O-ring. According to the invention the presence of the ribs 32 is not strictly necessary. For example, only one rib can be provided on which the seal 33 rests, or can be mounted immovably on the ring 28 of the seal, or form an integral part of this.

When mounting the cartridge consisting of adsorption elements stacked on one another, as shown in FIG. 5, the seal 33 will press against the inside wall of the vessel 2A. In this way, this construction not only ensures that leaks between the adsorption elements 19A mutually, but also between the cartridge and the wall of the vessel, are prevented.

Again it is clear that the embodiment concerned is not limited to an application in the vessel 2A, but it can just as well be applied in the vessel 2B of FIG. 1 and/or in the vessel 25 of FIG. 4, or in any other type of adsorption device 1 according to the invention.

Figure 6:
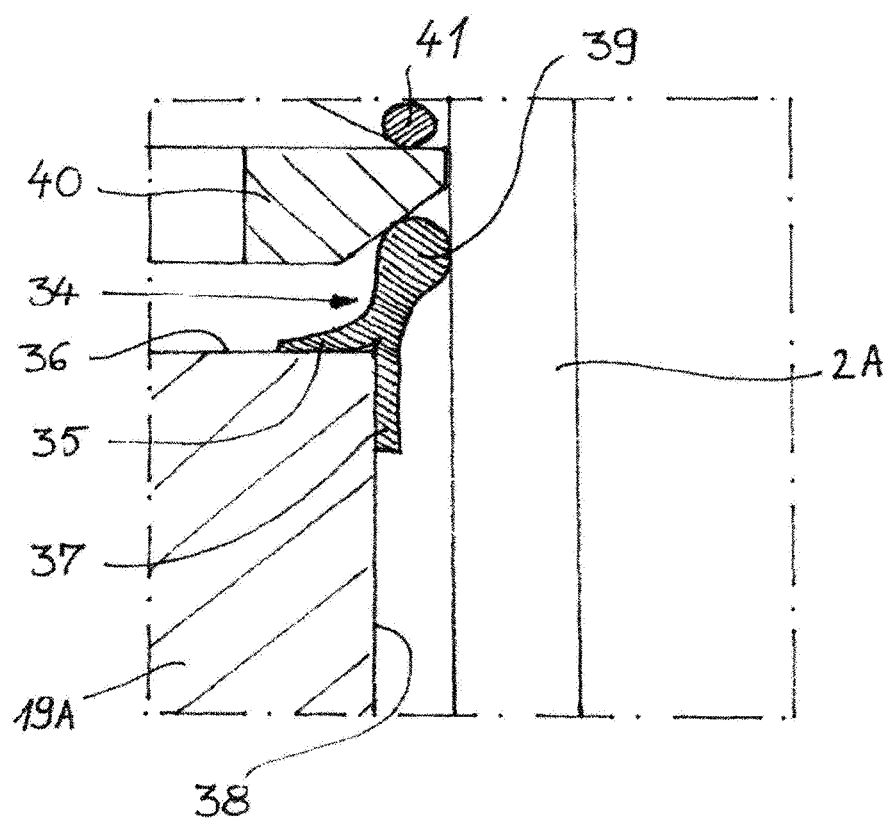
FIG. 6 shows a detail of the top edge of a stack of adsorption elements in the mounted state in a vessel.

FIG. 6 shows a detail of a top edge of a top part of a stack of adsorption elements 19A in a mounted state in a vessel 2A. The wall of the vessel 2A is shown in the right of the drawing. The same construction is possible on the bottom edge of a stack of adsorption elements or, when use is made of only one adsorption element in a vessel, on the top and/or bottom side of such a separate adsorption element.

A V-shaped seal 34 is pushed over the free peripheral edge of the adsorption element 19A, in other words the peripheral edge that is not oriented towards another adsorption element 19A, all such that a first arm 35 of the seal presses against the axial top surface 36 of the adsorption element 19A, while the second arm 37 of this seal 34 presses against the radial outside wall 38 of the adsorption element 19A.

In this case, the V-shaped seal 34 presents a lobate protuberance 39 on the top, or in other words on the side where the two arms 35 and 38 are connected together.

In an embodiment where a single cartridge with a single element is employed, it is preferred that the V-shaped seal is pushed over both the top peripheral edge and the bottom peripheral edge of the cartridge. The terms top and bottom are applicable when the cartridge is configured as shown in FIG. 6. However, the cartridge may be configured at any angle, not just as shown in FIG. 6.

According to a preferred characteristic of the invention, pressing means are provided that press a part of the seal 34 radially against the inside wall of the vessel 2A. In this example the pressing means concerned comprise a conical ring 40, that is pressed by means of a spring 41 against the lobate protuberance 39 of the seal 34. To this end the conical surface of the conical ring 40 is oriented towards the seal 34 concerned and presses the spring by its other end against the cover of the vessel 2A, for example.

It goes without saying that the part of the seal 34 that is pressed against the inside wall of the vessel 2A does not necessarily have to be lobate, and this part can be constructed in many different ways.

The largest outside diameter of the conical ring 40 is preferably, but not necessarily, almost as large as the inside diameter of the vessel 2A.

Alternatively, in the construction as shown by way of an example in FIG. 6, the seal at the top and bottom of the cartridge, consisting of a stack of adsorption elements 19A, can be obtained in different ways, for example by making use of a glued ring and an O-ring similar to the principle shown in FIG. 5.

Alternatively, the seal at the top and bottom of a single cartridge, consisting of a single adsorption element, can be obtained in different ways, for example by making use of a glued ring and an O-ring similar to the principle shown in FIG. 5.

Although in the above description an adsorption device in the form of a drying device for adsorbing moisture is primarily described, the invention also relates to other types of adsorption devices such as nitrogen generators and similar, whose adsorption element is able to adsorb certain gas molecules such as oxygen, carbon dioxide and/or similar. By removing such gas molecules from compressed air for example, as is known, nitrogen can be generated.

The present invention is by no means limited to the embodiments described as an example and shown in the drawings, but an adsorption device according to the invention for compressed gas can be realised in many forms and dimensions, without departing from the scope of the invention.

What is claimed is:

1. An adsorption device for a gas, comprising a vessel with an inlet for a gas to be treated, and an outlet for treated gas, an adsorption element affixed in the vessel, and a V-shaped seal,
   wherein the adsorption element extends along a flow direction of the gas to be treated, between the inlet and the outlet,
   wherein the adsorption element comprises a monolithic supporting structure that is at least partially provided with a coating that contains an adsorbent,
   wherein the V-shaped seal has a first arm, a second arm, and a protuberance that extends from a side of the V-shaped seal where the first arm and the second arm are connected together,
   wherein the monolithic supporting structure has an axial surface and an outside wall, the outside wall of the monolithic supporting structure facing an inside wall of the vessel,
   wherein the V-shaped seal is positioned over a free peripheral edge of the at least one adsorption element, such that the first arm of the seal presses against an axial surface of the at least one adsorption element, the second arm of the seal presses against an outside wall of the at least one adsorption element, and the protuberance presses against an inner wall of the vessel, and
   wherein said gas is a compressed gas or a non-compressed gas.

2. The adsorption device of claim 1, wherein the monolithic supporting structure comprises at least one of cordierite, mullite, γ- or α-alumina or silicon carbide (SiC), a metal foil, glass fiber, ceramic fiber, or a polymer.

3. The adsorption device of claim 1, wherein the monolithic supporting structure contains between 200 and 1200 CPSI (cells per square inch), has a wall thickness of between 2 and 11 mil (milli-inch), and has a wall porosity greater than 5%.

4. The adsorption device of claim 1, wherein the monolithic supporting structure contains between 350 and 450 CPSI (cells per square inch), has a wall thickness of between 3 and 9 mil (milli-inch), and has a wall porosity greater than 10%.

5. The adsorption device of claim 1, wherein the monolithic supporting structure has a wall thickness of between 5 and 7.5 mil (milli-inch), and has a wall porosity greater than 20%.

6. The adsorption device of claim 1, wherein the adsorbent comprises one or more of a zeolite, a silica gel, an activated alumina, an activated carbon, a metal-organic framework, a carbon molecular sieve (CMS), an impregnated adsorbent, and a hybrid adsorbent.

7. The adsorption device of claim 1, wherein the distribution of the particle size of the adsorbent is preferably such that D50 is less than 10 μm.

8. The adsorption device of claim 1, wherein the coating comprises a binder selected from colloidal silica, alumina, clay, methyl cellulose, an acrylic resin, and a vinyl resin.

9. The adsorption device of claim 1, wherein the protuberance is a lobate protuberance.

10. The adsorption device of claim 1, further comprising a pressing means for pressing the protuberance against the inner wall of the vessel.

11. An adsorption device for a gas, comprising a cartridge with an inlet for a supply of a gas to be treated, and an outlet for treated gas, at least one adsorption element affixed in the cartridge, and a V-shaped seal,
   wherein the at least one adsorption element extends along a flow direction of the gas to be treated, between the inlet and the outlet, wherein the at least one adsorption element comprises a monolithic supporting structure that is at least partially provided with a coating that contains an adsorbent, wherein the V-shaped seal has a first arm, a second arm, and a protuberance that extends from a side of the V-shaped seal where the first arm and the second arm are connected together, wherein the at least one adsorption element has an axial surface and an outside wall, the outside wall of the monolithic supporting structure facing an inside wall of the cartridge, wherein the V-shaped seal is positioned over a free peripheral edge of the at least one adsorption element, such that the first arm of the seal presses against an axial surface of the at least one adsorption element, the second arm of the seal presses against an outside wall of the at least one adsorption element, and the protuberance presses against an inner wall of the cartridge, and wherein said gas is a compressed gas or a non-compressed gas.

12. The adsorption device of claim 11, wherein the protuberance is a lobate protuberance.

13. The adsorption device of claim 11, further comprising a pressing means for pressing the protuberance against the inner wall of the cartridge.

14. A system comprising:

an adsorption device connected to a compressor, a blower, or a low-pressure device, and configured to receive the a gas to be treated, said adsorption device comprising:

a regeneration zone and an adsorption zone, wherein at least an outlet of the regeneration zone is connected to an inlet of the adsorption zone, at least one vessel provided in the regeneration zone and/or the adsorption zone, said at least one vessel comprising the inlet for the supply of the gas to be treated at a first end of the at least one vessel, and the outlet for a treated gas at a second end of the at least one vessel, and at least one adsorption element affixed in the at least one vessel, wherein the at least one adsorption element extends along a flow direction of the gas to be treated, between the inlet at the first end and the outlet at the second end, wherein the adsorption element comprises a monolithic supporting structure that is at least partially provided with a coating that contains an adsorbent, and wherein a V-shaped seal is over a free peripheral edge of the at least one adsorption element, such that a first arm of the seal presses against a surface of the at least one adsorption element, while a second arm of the seal presses against an outside wall of the at least one adsorption element, and wherein said gas to be treated is a compressed gas or a non-compressed gas.

* * * * *